United States Patent
Pavlath

(10) Patent No.: US 7,233,724 B2
(45) Date of Patent: Jun. 19, 2007

(54) LONG PERIOD BRAGG GRATING OPTICAL SIGNAL ATTENUATION

(75) Inventor: George A. Pavlath, Thousand Oaks, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/718,346

(22) Filed: Nov. 20, 2003

(65) Prior Publication Data

US 2005/0111790 A1    May 26, 2005

(51) Int. Cl.
| | |
|---|---|
| G02B 6/34 | (2006.01) |
| G02B 6/26 | (2006.01) |
| G02B 6/42 | (2006.01) |
| G02B 5/18 | (2006.01) |
| G02B 7/10 | (2006.01) |

(52) U.S. Cl. .............. 385/37; 385/27; 385/12; 385/14; 359/566; 359/350

(58) Field of Classification Search .............. 385/140, 385/10, 95, 96, 97, 99
See application file for complete search history.

(56) References Cited

U.S. PATENT DOCUMENTS

| | | | | |
|---|---|---|---|---|
| 5,231,465 A | * | 7/1993 | Huang et al. | 356/464 |
| 5,260,768 A | * | 11/1993 | Cordova et al. | 356/460 |
| 5,430,817 A | * | 7/1995 | Vengsarkar | 385/37 |
| 6,025,915 A | * | 2/2000 | Michal et al. | 356/460 |
| 6,108,086 A | * | 8/2000 | Michal et al. | 356/460 |
| 6,507,429 B1 | * | 1/2003 | Ales et al. | 359/341.1 |

(Continued)

FOREIGN PATENT DOCUMENTS

EP    0 961 104    12/1999

(Continued)

OTHER PUBLICATIONS

Vengsarkar, Ashish M., Lemaire, Paul J., Judkins, Justin B., Bhatia, Vikram, Erdogan, Turan, Sipe, John E., Long-Period Fiber Gratings as Band-Rejection Filters, Jan. 1996, Journal of Lightwave Technology, vol. 14, No. 1, pp. 58-65.*

(Continued)

*Primary Examiner*—Frank G. Font
*Assistant Examiner*—Erin D. Chiem
(74) *Attorney, Agent, or Firm*—Carmen B. Patti & Assoc., LLC

(57) ABSTRACT

An apparatus in one example comprises one or more light sources, one or more long period Bragg gratings that are optically coupled with the one or more light sources, and one or more amplification fibers that are optically coupled with the one or more long period Bragg gratings. The one or more light sources send one or more pump optical signals to one or more of the one or more long period Bragg gratings. The one or more of the one or more long period Bragg gratings transmit the one or more pump optical signals to one or more of the one or more amplification fibers. The one or more of the one or more amplification fibers absorb one or more of the one or more pump optical signals and emit one or more output signals. The one or more of the one or more long period Bragg gratings attenuate one or more of the one or more output signals.

25 Claims, 2 Drawing Sheets

U.S. PATENT DOCUMENTS

| | | | |
|---|---|---|---|
| 6,584,246 B1* | 6/2003 | Michal et al. | 385/27 |
| 6,603,598 B1* | 8/2003 | Oliveti et al. | 359/341.5 |
| 6,611,641 B2* | 8/2003 | Ghera et al. | 385/27 |
| 6,631,224 B2* | 10/2003 | Sorin et al. | 385/28 |
| 6,678,087 B1* | 1/2004 | Masuda et al. | 359/334 |
| 6,731,837 B2* | 5/2004 | Goldberg et al. | 385/27 |
| 2001/0012147 A1* | 8/2001 | Lutz et al. | 359/337.2 |
| 2002/0094159 A1* | 7/2002 | Goldberg et al. | 385/27 |

FOREIGN PATENT DOCUMENTS

| | | |
|---|---|---|
| EP | 1 271 194 | 1/2003 |
| WO | WO 02/13339 | 2/2002 |
| WO | WO 02/052311 | 7/2002 |

OTHER PUBLICATIONS

Orthonos, Andreas, Kalli, Kyriacos, Fiber Bragg Gratings and Fundamentals and Applications in Telecommunications and Sensing, 1999, Artech House, Inc., pp. 142-143.* searchNetworking.com Definitions, "Attenuation", 2001.*
http://www.gemini-inc.com/appnotes/optical/foguide/guide4.htm, Lennie Lightwave's Guide to Fiber Optics: Termination and Splicing, 2000.*
www.dictionary.com, Sep. 2004.*
Long Period Gratings, http://www.cranfield.ac.uk/sme/cpoe/cpoebrag3.htm, Nov. 3, 2003, 2 pgs., United Kingdom.
Long Period Grating, http://www.o-eland.com/long_period_grating_page.htm, Nov. 3, 2003/, 2 pgs., Canada.
Optical Fibres, http://floti.bell.ac.uk/MathsPhysics/2optical.htm, Nov. 3, 2003, 2 pgs., United Kingdom.
Laser Diodes, http://www.tpub.com/neets/tm/110-5.htm, Nov. 3, 2003, 3 pgs., USA.
Fiber Bragg Gratings, http://www.crc.ca/en/html/crc/home/tech_transfer/bragg, Oct. 7, 2003, 4 pgs., Canada.
TechEncyclopedia, http://www.techweb.com/encyclopedia/defineterm?term=fiberBragggrating, Jul. 22, 2003, 3 pgs., USA.
Attenuate, http://dictionary.reference.com/search?q=attenuate, Sep. 22, 2003, 1 pg., USA.

* cited by examiner

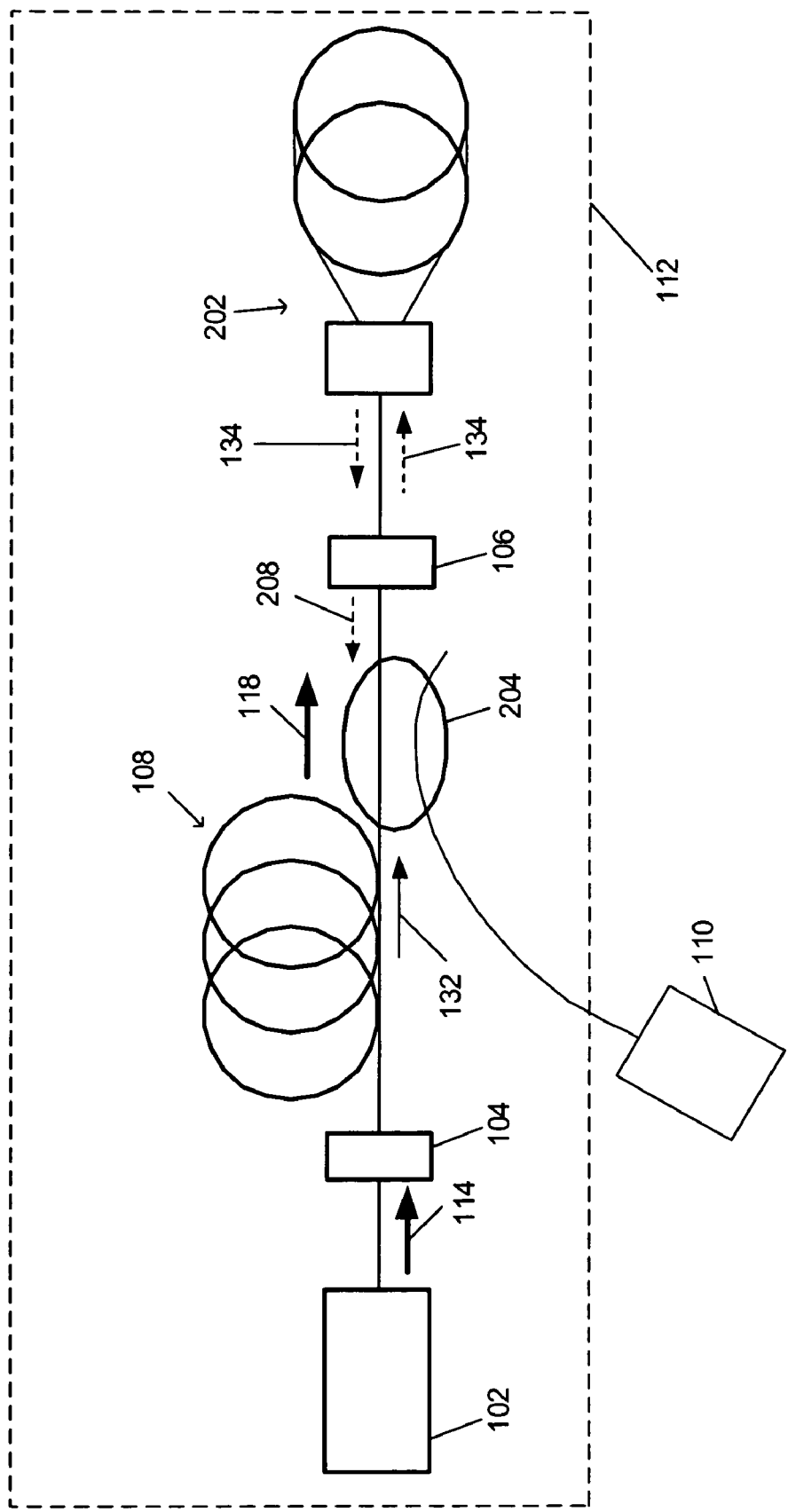

LONG PERIOD BRAGG GRATING OPTICAL SIGNAL ATTENUATION

TECHNICAL FIELD

The invention relates generally to fiber optics and more particularly to attenuation of optical signals.

BACKGROUND

Optical components, for example, a fiber optic gyroscope, use optical signals generated by broadband fiber sources. In one design of a backwards pumped broadband fiber source, a light source sends pump light through a wave division multiplexing ("WDM") fiber to a rare-earth doped fiber. The rare-earth doped fiber absorbs the pump light and emits the output signals. This design suffers shortcomings from the use of the wave division multiplexing fiber to transmit the light for transmission to the rare-earth doped fiber. As one example, the wave division multiplexing fiber adds a significant cost to manufacture of the broadband fiber source. As another example, the wave division multiplexing fiber adds undesirable effects such as polarization splitting.

In one design of a forward pumped broadband fiber source, the light source sends the pump light directly to the rare-earth doped fiber. The forward pumped broadband fiber source omits the wave division multiplexing fiber of the design of the backwards pumped broadband fiber source discussed above. However, the light source comprises a facet face that, in this design, backreflects one or more of the output signals toward the fiber optic gyroscope. The backreflection of the output signals causes an oscillation in the broadband fiber source, which disrupts operation of the fiber optic gyroscope.

Thus, a need exists for attenuation of optical signals to promote a reduction of backreflection. A further need exists for attenuation of optical signals with a reduced cost of manufacture.

SUMMARY

The invention in one implementation encompasses an apparatus. The apparatus comprises one or more light sources, one or more long period Bragg gratings that are optically coupled with the one or more light sources, and one or more amplification fibers that are optically coupled with the one or more long period Bragg gratings. The one or more light sources send one or more pump optical signals to one or more of the one or more long period Bragg gratings. The one or more of the one or more long period Bragg gratings transmit the one or more pump optical signals to one or more of the one or more amplification fibers. The one or more of the one or more amplification fibers absorb one or more of the one or more pump optical signals and emit one or more output signals. The one or more of the one or more long period Bragg gratings attenuate one or more of the one or more output signals.

Another implementation of the invention encompasses a method. A reduction of backreflection of one or more output signals from one or more amplification fibers of a broadband fiber source is promoted through employment of one or more long period Bragg gratings.

DESCRIPTION OF THE DRAWINGS

Features of exemplary implementations of the invention will become apparent from the description, the claims, and the accompanying drawings in which:

FIG. 2 is a representation of another exemplary implementation of the apparatus of FIG. 1 that further comprises one or more optical couplers and one or more optical circulators.

DETAILED DESCRIPTION

Figure 1:
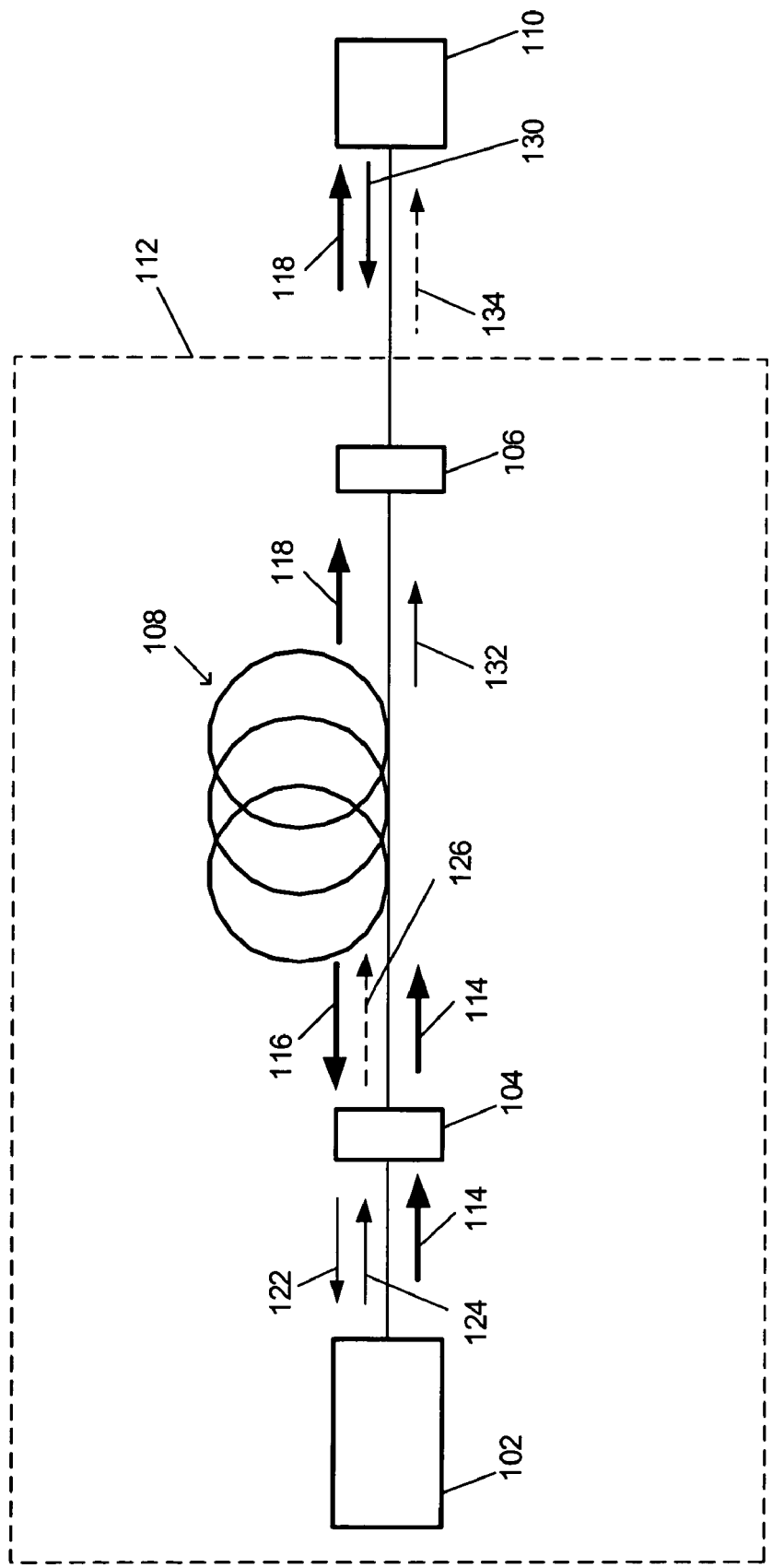
FIG. 1 is a representation of one exemplary implementation of an apparatus that comprises one or more light sources, one or more long period Bragg gratings, one or more amplification fibers, and one or more optical components that are optically coupled with one another.

Turning to FIG. 1, an apparatus 100 in one example comprises a plurality of components such as hardware components. A number of such components can be combined or divided in the apparatus 100.

The apparatus 100 in one example comprises one or more light sources 102, one or more long period Bragg gratings 104, and one or more amplification fibers 108 that provide light to an optical component 110. In a further example, the apparatus 100 comprises one or more long period Bragg gratings 106. The light sources 102, long period Bragg gratings 104 and 106, and amplification fibers 108 in one example are optically coupled with one another, for example, by a fiber optic cable or waveguide. For example, the light source 102 is optically coupled with the long period Bragg grating 104, the long period Bragg grating 104 is optically coupled with the amplification fiber 108, and the amplification fiber 108 is optically coupled with the optical component 110. In another example, the amplification fiber 108 is optically coupled with the long period Bragg grating 106, and the long period Bragg grating 106 is optically coupled with the optical component 110. In one example, the light source 102, the long period Bragg gratings 104 and 106, and the amplification fiber 108 are fusion-spliced to be optically coupled, as will be appreciated by those skilled in the art. The light source 102, long period Bragg gratings 104 and 106, and amplification fibers 108 in one example comprise a portion of a broadband fiber source 112.

The light source 102 in one example comprises a pump diode laser, for example, an indium gallium arsenide ("InGaAs") laser diode. A front facet of the light source 102 in one example comprises a surface that reflects optical signals. The light source 102 in one example converts electricity into light, for example, one or more pump optical signals 114. The pump optical signals 114 in one example comprise a substantially same pump wavelength $\lambda_p$.

The long period Bragg gratings 104 and 106 comprise an optical core and a cladding that covers the optical core. For example, the optical core comprises a higher refractive index than the cladding to promote total internal reflection of light within the optical core. The long period Bragg gratings 104 and 106 comprise corresponding wavelength attenuation ranges. For example, the optical core of the long period Bragg grating 104 couples optical signals with a wavelength within the wavelength attenuation range to the cladding to attenuate the optical signals. The long period Bragg gratings 104 and 106 in one example attenuate the optical signals by twenty decibels, as will be appreciated by those skilled in the art.

The wavelength attenuation range of the long period Bragg gratings 104 and/or 106 in one example comprises a plurality of wavelength attenuation sub-ranges. For example, the long period Bragg grating 104 is represented by a plurality of long period Bragg gratings. The plurality of long period Bragg gratings comprise the plurality of wavelength attenuation sub-ranges. The plurality of long period Bragg gratings are optically coupled in series to provide the wavelength attenuation range of the long period Bragg grating 104.

In one example, the wavelength attenuation sub-ranges are staggered to cover the wavelength attenuation range. For example, none (i.e., zero) of the wavelength attenuation sub-ranges overlap. In another example, one or more of the wavelength attenuation sub-ranges overlap a portion of an adjacent wavelength attenuation sub-range. For example, a first long period Bragg grating provides a lower sixty percent of the wavelength attenuation range and a second long period Bragg grating provides an upper sixty percent of the wavelength attenuation range, and a central twenty percent of the first and second wavelength attenuation ranges is overlapped by the first and second long period Bragg gratings.

The amplification fiber 108 in one example comprises a rare earth doped fiber, for example, an erbium or neodymium doped fiber. The amplification fiber 108 receives and absorbs one or more optical signals and emits a plurality of output signals, for example, output signals 116 and 118, through amplified spontaneous emission. In one example, the amplification fiber 108 directs the output signals 116 towards the long period Bragg grating 104. In a further example, the amplification fiber 108 directs the output signals 118 towards the optical component 110. The output signals 116 and 118 comprise a substantially same signal wavelength $\lambda_s$. The wavelength $\lambda_p$ and the wavelength $\lambda_s$ comprise different wavelengths, as will be appreciated by those skilled in the art.

The optical component 110 in one example comprises a fiber optic gyroscope. The optical component 110 employs one or more optical signals of wavelength $\lambda_s$ to perform a task, for example, to determine a magnitude of rotation. The optical component 110 returns one or more of the optical signals to the broadband fiber source 112. For example, the optical component 110 employs one or more of the output signals 118 to determine a magnitude of rotation.

An illustrative description of exemplary operation of the apparatus 100 is presented, for explanatory purposes. The light source 102 generates one or more pump optical signals 114 of wavelength $\lambda_p$ and sends the pump optical signals 114 towards the long period Bragg grating 104. The wavelength attenuation range of the long period Bragg grating 104 omits the wavelength $\lambda_p$, and the long period Bragg grating 104 transmits the pump optical signals 114 to the amplification fiber 108.

The amplification fiber 108 absorbs one or more of the pump optical signals 114. Through amplified spontaneous emission, the amplification fiber 108 emits a plurality of output signals, for example, output signals 116 and 118. The amplification fiber 108 directs the output signals 116 towards the long period Bragg grating 104 and directs the output signals 118 towards the optical component 110 through the long period Bragg grating 106.

The wavelength attenuation range of the long period Bragg grating 104 comprises the signal wavelength $\lambda_s$ of the output signals 116. The long period Bragg grating 104 attenuates the output signals 116 and creates one or more output signals 122. The front facet of the light source 102 causes a backreflection of one or more of the output signals 122, for example, output signals 124, toward the long period Bragg grating 104, as will be appreciated by those skilled in the art.

The long period Bragg grating 104 attenuates the output signals 116 to promote a reduction of backreflection of the output signals 116 incident on the front facet of the long period Bragg grating 104. The long period Bragg grating 104 attenuates the output signals 124 and creates one or more output signals 126. The long period Bragg grating 104 attenuates the output signals 116 and 124 to promote a reduction of oscillation of the output signals 116, as will be appreciated by those skilled in the art.

The wavelength attenuation range of the long period Bragg grating 106 in one example omits the wavelength $\lambda_s$ and the long period Bragg grating 106 transmits the output signals 118 to the optical component 110, as will be appreciated by those skilled in the art. The optical component 110 employs the output signals 118 to perform a task, and returns one or more of the output signals 118, for example, one or more output signals 130, to the broadband fiber source 112. The long period Bragg grating 104 attenuates the output signals 130 analogous to the output signals 116.

The amplification fiber 108 in one example transmits one or more residual signals 132 of the pump optical signals 114. The wavelength attenuation range of the long period Bragg grating 106 in one example comprises the wavelength $\lambda_p$. The long period Bragg grating 106 attenuates the residual signals 132 and creates one or more residual signals 134. Where the optical component 110 comprises a fiber optic gyroscope, the long period Bragg grating 106 attenuates the residual signals 132 to promote a reduction of a scale factor linearity error of the fiber optic gyroscope.

Turning to FIG. 2, the apparatus 100 in another example comprises one or more light sources 102, one or more long period Bragg gratings 104 and 106, one or more amplification fibers 108, one or more optical components 202, and one or more optical couplers 204 that provide light to an optical component 110. The optical component 202 in one example comprises a multi-function integrated optic chip and one or more portions of an optical fiber or waveguide. The optical component 202 redirects optical signals from the long period Bragg grating 106 back into the long period Bragg grating 106. The optical coupler 204 redirects optical signals from the long period Bragg grating 106 to the optical component 110.

The light source 102 generates pump optical signals 114, analogous to FIG. 1. The amplification fiber 108 absorbs one or more of the pump optical signals 114 and emits the output signals 118. The amplification fiber 108 transmits the residual signals 132 to the long period Bragg grating 106. The long period Bragg grating 106 transmits the output signals 118 to the optical component 202. The optical component 202 redirects the output signals 118 back into the long period Bragg grating 106 toward the optical coupler 204. The optical coupler 204 redirects the output signals 118 to the optical component 110.

The long period Bragg grating 106 attenuates the residual signals 132 and creates one or more residual signals 134. Where the optical component 110 comprises a fiber optic gyroscope, the long period Bragg grating 106 attenuates the residual signals 132 to promote a reduction of a scale factor linearity error of the fiber optic gyroscope. The optical component 202 redirects the residual signals 134 back into the long period Bragg grating 106 toward the optical coupler 204. The long period Bragg grating 106 attenuates the residual signals 134 and creates residual signals 208. The optical coupler 204 redirects the residual signals 208 to the optical component 110.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus, comprising:
    a light source;
    a long period Bragg grating that is optically coupled with the light source via a first optical splice; and
    an amplification fiber that is optically coupled with the long period Bragg grating via a second optical splice;
    wherein the light source and the amplification fiber are arranged in a forward pumped broadband fiber source configuration without an optical multiplexer between the light source and the amplification fiber;
    wherein the light source sends one or more pump optical signals to the long period Bragg grating;
    wherein the long period Bragg grating transmits the one or more pump optical signals to the amplification fiber;
    wherein the amplification fiber absorbs a subset of the one or more pump optical signals and emits one or more output signals toward the light source;
    wherein the long period Bragg grating attenuates the one or more output signals.

2. The apparatus of claim 1, wherein the one or more pump optical signals comprise a substantially same first wavelength, wherein the one or more output signals comprise a substantially same second wavelength, wherein the first wavelength and the second wavelength comprise different wavelengths;
    wherein the long period Bragg grating comprises a wavelength attenuation range that omits the substantially same first wavelength and comprises the substantially same second wavelength;
    wherein the long period Bragg grating transmits the one or more pump optical signal to the amplification fiber;
    wherein the long period Bragg grating attenuates the one or more output signals.

3. The apparatus of claim 2, wherein the wavelength attenuation range comprises a plurality of wavelength attenuation sub-ranges, wherein the plurality of wavelength attenuation sub-ranges comprise zero or more wavelength attentuation sub-ranges that overlap.

4. The apparatus of claim 1, wherein the long period Bragg grating comprises a first long period Bragg grating, the apparatus further comprising a second long period Bragg grating;
    wherein the first long period Bragg grating is optically coupled with a first side of the amplification fiber via the second optical splice, wherein the second long period Bragg grating is optically coupled with a second side of the amplification fiber via a third optical splice;
    wherein the first long period Bragg grating attenuates the one or more output signals;
    wherein the amplification fiber receives the one or more pump optical signals and transmits one or more residual signals of the one or more pump optical signals to the second long period Bragg grating;
    wherein the second long period Bragg grating attenuates the one or more residual signals.

5. The apparatus of claim 4, wherein the one or more output signals comprise one or more first output signals;
    wherein the amplification fiber absorbs a subset of the one or more pump optical signals and emits the one or more first output signals toward the first long period Bragg grating and emits one or more second output signals toward the second long period Bragg grating;
    wherein the first long period Bragg grating attenuates the one or more first output signals;
    wherein the second long period Bragg grating transmits the one or more second output signals to a first optical component.

6. The apparatus of claim 5, wherein the one or more first output signals and one or more second output signals comprise a substantially same first wavelength, wherein the one or more pump optical signals and the one or more residual signals comprise a substantially same second wavelength;
    wherein the first long period Bragg grating comprises:
        a first cladding;
        a first core surrounded by the first cladding, wherein the first core couples a subset of the one or more first output signals to the first cladding to attenuate the one or more first output signals; and
        a first wavelength attenuation range that comprises the substantially same first wavelength and omits the substantially same second wavelength;
    wherein the second long period Bragg grating comprises:
        a second cladding;
        a second core surrounded by the second cladding, wherein the second core couples a subset of the one or more residual signals to the second cladding to attenuate the one or more residual signals; and
        a second wavelength attentuation range that omits the substantially same first wavelength and comprises the substantially same second wavelength.

7. The apparatus of claim 6, wherein the first long period Bragg grating attenuates the one or more first output signals to promote a reduction of backreflection of the one or more first output signals.

8. The apparatus of claim 7 in combination with the first optical component, wherein the first optical component receives the one or more second output signals from the second long period Bragg grating and returns a subset of the one or more second output signals to the second long period Bragg grating;
    wherein the second long period Bragg grating transmits the subset of the one or more second output signals through the amplification fiber to the first long period Bragg grating;
    wherein the first long period Bragg grating attenuates the subset of the one or more second output signals to promote a reduction of backreflection of the one or more second output signal.

9. The apparatus of claim 5 in combination with the first optical component wherein the first optical component, comprises a fiber optic gyroscope.

10. The apparatus of claim 9, wherein the fiber optic gyroscope comprises a scale factor linearity error;
    wherein the second long period Bragg grating attenuates the one or more residual signals to promote a reduction of the scale factor linearity error of the fiber optic gyroscope.

11. The apparatus of claim 5, wherein the one or more residual signals comprise one or more first residual signals, wherein the first optical component redirects the one or more second residual signals and the one or more second output signals back through the second long period Bragg grating, the apparatus further comprising:
    a second optical component optically coupled with the second long period Bragg grating;

wherein the second long period Bragg grating receives the one or more first residual signals and the second output signal from the first optical component, wherein the second long period Bragg grating attenuates the one or more first residual signals to create one or more second residual signals;

wherein the second long period Bragg grating attenuates the one or more second residual signals and transmits the one or more second output signals towards the second optical component.

12. The apparatus of claim 11, further comprising:
an optical coupler that is coupled with the second long period Bragg grating; wherein the optical coupler directs the one or more second output signals to the second optical component.

13. The apparatus of claim 12, wherein the first optical component comprises a multi-function integrated optic chip.

14. The apparatus of claim 1, wherein the amplification fiber comprises an erbium-doped fiber.

15. The apparatus of claim 1, wherein the light source comprises a pump diode laser.

16. The apparatus of claim 1, wherein the first and second optical splices comprise first and second fusion splices.

17. The apparatus of claim 1, wherein the long period Bragg grating comprises a cladding and an optical core surrounded by the cladding;
wherein the optical core couples a subset of the one or more output signals to the cladding to attenuate the one or more output signals.

18. The apparatus of claim 1, wherein the long period Bragg grating promotes a reduction of backreflection of the one or more output signals through attenuation of the one or more output signals;
wherein the light source causes the backreflection of a subset of the one or more output signals and creates one or more backreflected signals, wherein the light source directs the one or more backreflected signals toward the long period Bragg grating;
wherein the long period Bragg grating attenuates the one or more backreflected signals to promote a reduction of oscillation of the one or more output signals.

19. A method, comprising the step of:
promoting a reduction of backreflection of an output signal from an amplification fiber of a forward pumped broadband fiber source through employment of a long period Bragg grating that is optically spliced directly between the amplification fiber and a light source without an optical multiplexer between the light source and the amplification fiber.

20. The method of claim 19, wherein the step of promoting comprises the step of:
attenuating the output signal through employment of the long period Bragg grating.

21. The method of claim 20, wherein the long period Bragg grating comprises a first long period Bragg grating, the method further comprising the step of:
promoting a reduction of scale factor linearity error for a fiber optic gyroscope through employment of a second long period Bragg grating that is optically spliced to the amplification fiber and the fiber optic gyroscope, wherein the fiber optic gyroscope employs one or more of the one or more output signals.

22. The method of claim 21, wherein the step of promoting the reduction of scale factor linearity error for the fiber optic gyroscope comprises the step of:
attenuating a residual signal from the light source before the residual signal reaches the fiber optic gyroscope.

23. The apparatus of claim 1, wherein the light source is optically coupled directly to the long period Bragg grating via the first optical splice;
wherein the long period Bragg grating is optically coupled directly to the amplification fiber via the second optical splice;
wherein the forward pumped broadband fiber source configuration comprises only the light source, the long period Bragg grating, and the amplification fiber.

24. The apparatus of claim 4, wherein the first, second, and third optical splices comprise first, second, and third fusion splices;
wherein the light source is optically coupled directly to the first long period Bragg grating via the first fusion splice;
wherein the first long period Bragg grating is optically coupled directly to the amplification fiber via the second fusion splice;
wherein the amplification fiber is optically coupled directly to the second long period Bragg grating via the third fusion splice;
wherein the forward pumped broadband fiber source configuration comprises only the light source, the first long period Bragg grating, the amplification fiber, and the second long period Bragg grating.

25. An apparatus, comprising:
a long period Bragg grating that comprises a wavelength attenuation range;
a pump diode laser optically coupled directly to a first side of a long period Bragg grating via a first optical splice;
an amplification fiber that is optically coupled directly to a second side of the long period Bragg grating via a second optical splice;
wherein the pump diode laser and the amplification fiber are arranged in a forward pumped broadband fiber source configuration without an optical multiplexer between the light source and the amplification fiber;
wherein a wavelength of the pump optical signal is outside of the wavelength attenuation range of the long period Bragg grating;
wherein a wavelength of the output signal is within the wavelength attenuation range of the long period Bragg grating;
wherein the long period Bragg grating is configured to transmit the pump optical signal from the pump diode laser to the amplification fiber and attenuate the output signal form the amplification fiber to the pump diode laser.

* * * * *